US012762737B2

(12) United States Patent
Sun et al.

(10) Patent No.: US 12,762,737 B2
(45) Date of Patent: Oct. 13, 2026

(54) SURGICAL POSITIONING SYSTEM AND POSITIONING METHOD THEREOF

(71) Applicant: V5 TECHNOLOGIES CO., LTD., Hsinchu (TW)

(72) Inventors: Jason Sun, Hsinchu (TW); Tzu-Kuei Shen, Hsinchu (TW); Kuo-Tung Hung, Hsinchu (TW); Linda Siana, Hsinchu (TW)

(73) Assignee: V5MED INC., Zhubei City (TW)

( * ) Notice: Subject to any disclaimer, the term of this patent is extended or adjusted under 35 U.S.C. 154(b) by 365 days.

(21) Appl. No.: 18/369,637

(22) Filed: Sep. 18, 2023

(65) Prior Publication Data

US 2024/0346689 A1 Oct. 17, 2024

(30) Foreign Application Priority Data

Apr. 14, 2023 (TW) ................................ 112114103

(51) Int. Cl.
*G06T 7/73* (2017.01)

(52) U.S. Cl.
CPC ...... *G06T 7/75* (2017.01); *G06T 2207/10081* (2013.01); *G06T 2207/10088* (2013.01); *G06T 2207/10104* (2013.01)

(58) Field of Classification Search
CPC ............. G06T 7/75; G06T 2207/10081; G06T 2207/10088; G06T 2207/10104
See application file for complete search history.

(56) References Cited

U.S. PATENT DOCUMENTS

| | | | | |
|---|---|---|---|---|
| 2015/0125033 | A1* | 5/2015 | Murphy | G06T 7/251 382/103 |
| 2019/0090955 | A1* | 3/2019 | Singh | A61B 17/00 |
| 2020/0394821 | A1* | 12/2020 | Huang | A61B 5/055 |
| 2020/0411163 | A1* | 12/2020 | Zehavi | A61B 6/505 |
| 2023/0390021 | A1* | 12/2023 | Polchin | A61B 34/30 |

(Continued)

FOREIGN PATENT DOCUMENTS

| | | |
|---|---|---|
| TW | I716924 B | 1/2021 |
| TW | I730242 B | 6/2021 |
| TW | I741359 B | 10/2021 |

(Continued)

*Primary Examiner* — Amandeep Saini
*Assistant Examiner* — Andrew S Budisalich
(74) *Attorney, Agent, or Firm* — Birch, Stewart, Kolasch & Birch, LLP

(57) ABSTRACT

A surgical positioning system and a positioning method thereof arrange positioning elements on a user. An image-capturing device prescans the body of the user to generate a set of scanned images that include first marker points representing the positions of the positioning elements. A host creates a 3D model of the body with the set of scanned images. An X-ray machine scans the body of the user to generate a set of 2D images including second marker points representing the positions of the positioning elements during the operation of the user. The host aligns the second marker points to the first marker points to reconstruct the 3D model, thereby generating a 3D surgical model representing a posture of the user during surgery. The present invention can generate a 3D surgical model corresponding to the user's current posture during surgery to accurately locate the position of the lesion.

11 Claims, 5 Drawing Sheets

(56) References Cited

U.S. PATENT DOCUMENTS

2024/0315776 A1 * 9/2024 Zhang .................... A61B 34/20

FOREIGN PATENT DOCUMENTS

| | | | |
|---|---|---|---|
| TW | 202145970 | A | 12/2021 |
| TW | I749921 | B | 12/2021 |
| TW | I749922 | B | 12/2021 |
| TW | I758857 | B | 3/2022 |
| TW | I762812 | B | 5/2022 |

* cited by examiner

SURGICAL POSITIONING SYSTEM AND POSITIONING METHOD THEREOF

This application claims priority for the TW patent application Ser. No. 11/211,4103 filed on 14 Apr. 2023, the content of which is incorporated by reference in its entirety.

BACKGROUND OF THE INVENTION

Field of the Invention

The present invention relates to surgical positioning technology, particularly to a surgical positioning system and a positioning method thereof.

Description of the Related Art

Because minimally invasive surgery does not open the skin, but only drills holes in the skin to allow the scalpel to go deep into the body, the surgical field of view depends entirely on the 3D images constructed by the computer. Therefore, the precise positioning of the lesion in minimally invasive surgery is a very important issue in related applications such as diagnosis, treatment and prognosis. Taking the thoracic department as an example, the preoperative evaluation and surgical resection of the thoracic surgery are performed to position the real location of the nodules. The thoracic medicine department performs endobronchial ultrasound transbronchial needle aspiration (EBUS-TBNA) to sample endoscopic lymph node with fine needle, thereby determining the cancer stage. Taking orthopedics as an example, implantation of bone nails in the spine and three-dimensional (3D) image synthesis of bone tumor implants in spinal surgery need to precisely position the lesion during surgery.

However, preoperative positioning is performed using hook needles and injection of methylene blue markers. Thus, it is necessary to take another computerized tomography before the operation or to take multiple X-ray images at different angles during the operation. In addition, during surgery, the condition of the lungs may have been greatly different from that at the time of shooting due to reasons such as non-inflated state and limited visual field. Furthermore, methylene blue has been metabolized in the body and all colored parts are removed. It is easy to be unable to know exactly what tissue should be sent to pathology. There is also a way to generate a 3D model after taking computerized tomography and then take X-ray images during the operation to adjust the angle of the scalpel. But this method is also quite inconvenient.

To overcome the abovementioned problems, the present invention provides a surgical positioning system and a positioning method thereof, so as to solve the afore-mentioned problems of the prior art.

SUMMARY OF THE INVENTION

The primary objective of the present invention is to provide a surgical positioning system and a positioning method thereof, which photograph X-ray images during the operation and align them with a three-dimensional (3D) model scanned before the operation to solve the problem that the position difference between the lesion and the body is too far apart during the operation to accurately position the lesion.

Another objective of the present invention is to provide a surgical positioning system and a positioning method thereof, which only need to take one computerized tomography (CT) scan without taking another one before the operation and taking multiple X-ray images at different angles during the operation.

In order to achieve the foregoing objectives, the present invention provides a surgical positioning system that includes: positioning elements, an image-capturing device, an X-ray machine, and a host. The positioning elements are arranged on a user. The image-capturing device is configured to prescan the body of the user to generate a set of scanned images that include first marker points representing the positions of the positioning elements. The X-ray machine is configured to photograph the body of the user at the beginning of operation preparation to generate a set of two-dimensional (2D) images including second marker points representing the positions of the positioning elements. The host is connected to the image-capturing device and the X-ray machine and configured to create a three-dimensional (3D) model of the body with the set of scanned images and align the second marker points to the first marker points to reconstruct the 3D model, thereby generating a three-dimensional (3D) surgical model representing the posture of the user during surgery.

In an embodiment of the present invention, the positioning elements are attached to corresponding positions of the user.

In an embodiment of the present invention, the positioning elements are arranged in the corresponding positions of immutable tissues including bones or joints.

In an embodiment of the present invention, the X-ray machine is arranged above an operating table. When the user is lying on the operating table and ready to start operation, the X-ray machine photographs the set of 2D images.

In an embodiment of the present invention, the first marker points include a first reference point and first comparison points and the second marker points include a second reference point and second comparison points. After the host aligns the first reference point to the second reference point, the host rotates the set of 2D images according to relative distances and relative angles between the first comparison points and the first reference point and relative distances and relative angles between the second comparison points and the second reference point and moves the first comparison points to respectively correspond to the second comparison points, thereby reconstructing the 3D model into the 3D surgical model.

In an embodiment of the present invention, the X-ray machine further photographs an auxiliary image of the affected area of the user. The host is configured to combine the set of 2D images with the auxiliary image for precise positioning.

The present invention also provides a surgical positioning method comprising: by an image-capturing device, rescanning a body of the user provided with positioning elements to generate a set of scanned images that include first marker points representing positions of the positioning elements; by a host, creating a three-dimensional (3D) model of the body with the set of scanned images; by an X-ray machine, scanning the body of the user at beginning of operation preparation to generate a set of two-dimensional (2D) images including second marker points representing positions of the positioning elements; and by the host, aligning the second marker points to the first marker points to reconstruct the 3D model, thereby generating a three-dimensional (3D) surgical model representing a posture of the user during surgery.

Below, the embodiments are described in detail in cooperation with the drawings to make easily understood the technical contents, characteristics and accomplishments of the present invention.

DETAILED DESCRIPTION OF THE INVENTION

The technical solutions in the embodiments of the present invention will be clearly and completely described below with reference to the drawings in the embodiments of the present invention. Obviously, the described embodiments are part of the embodiments of the present invention, not all of the embodiments. Based on the embodiments of the present invention, all other embodiments obtained by those skilled in the art without making inventive efforts should be included within the scope of the present invention.

It should be understood that, when used in this specification and the scope of the claims, the terms "comprising" and "including" refer to the presence of a stated feature, whole, step, operation, element, and/or component, but does not exclude the presence or addition of one or more other features, wholes, steps, operations, elements, components and/or combinations of these.

It should also be understood that the terms used in the specification of the present invention is only used to describe particular embodiments but not intended to limit the present invention. As used in this specification and the claims, the singular forms "a," "an," and "the" are intended to include the plural forms unless the context clearly dictates otherwise.

Figure 1:
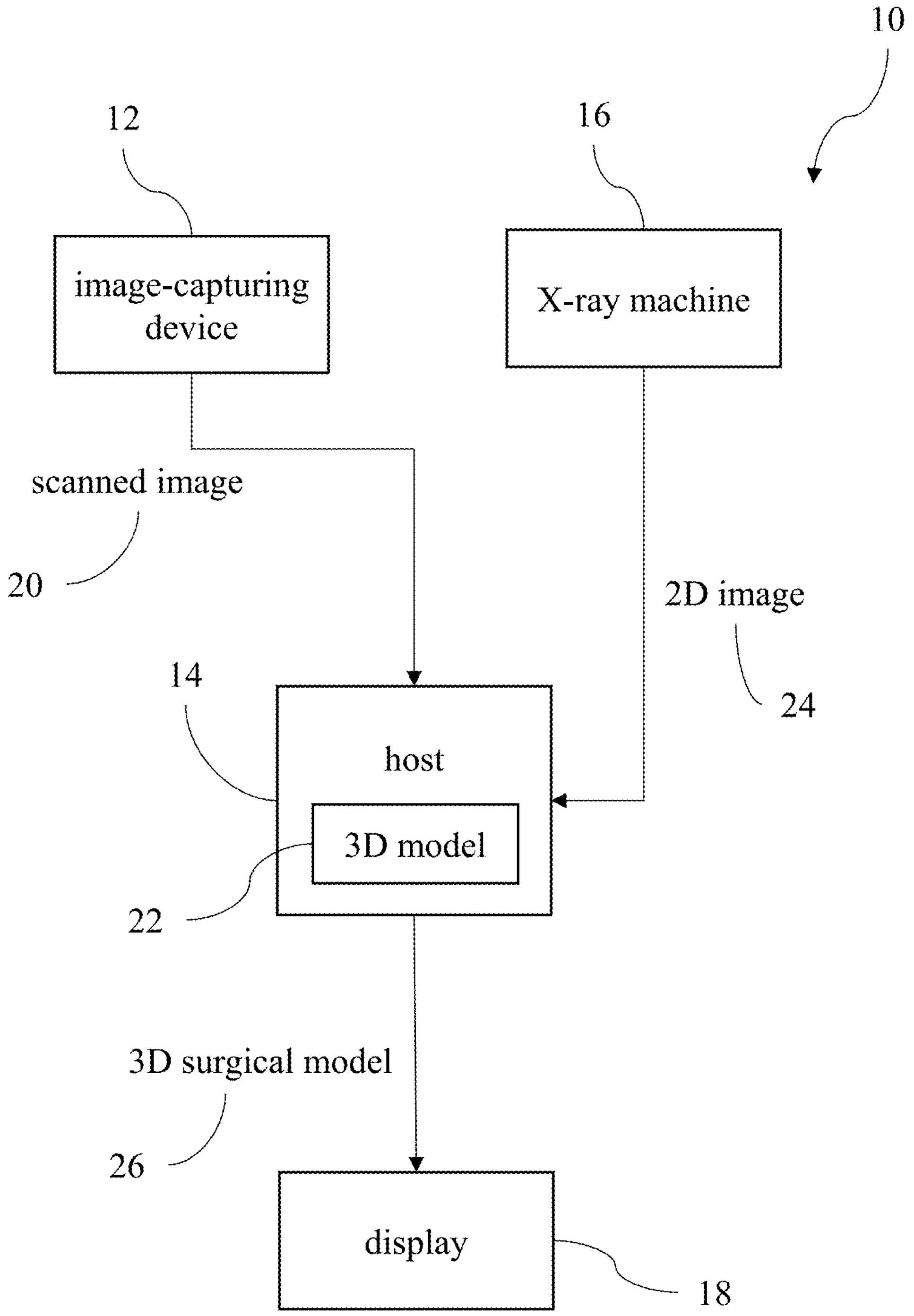
FIG. 1 is a schematic diagram illustrating a surgical positioning system according to an embodiment of the present invention.

It should further be understood that the terms "and/or" used in the specification and the claims refer to any and all possible combinations of one or more of the associated listed items and include these combinations. FIG. 1 is a schematic diagram illustrating a surgical positioning system according to an embodiment of the present invention. A surgical positioning system includes positioning elements (not illustrated), an image-capturing device 12, an X-ray machine 16, and a host 14. The host 14 is connected to the image-capturing device 12 and the X-ray machine 16. The positioning elements are arranged on a user.

The image-capturing device 12 may be a computerized tomography (CT) device, a magnetic resonance imaging (MRI) device, a positron emission tomography device, or a single-photon emission tomography device. The image-capturing device 12 prescans the body of the user before the user's operation preparation begins (for example, after the user has been anesthetized). After scanning the body, the image-capturing device 12 generates a set of scanned images 20 that include first marker points representing the positions of the positioning elements and provides them for the host 14. The host 14 receives the scanned images 20 sent by the image-capturing device 12 and creates a three-dimensional (3D) model of the body with the set of scanned images 20.

Figure 4A:
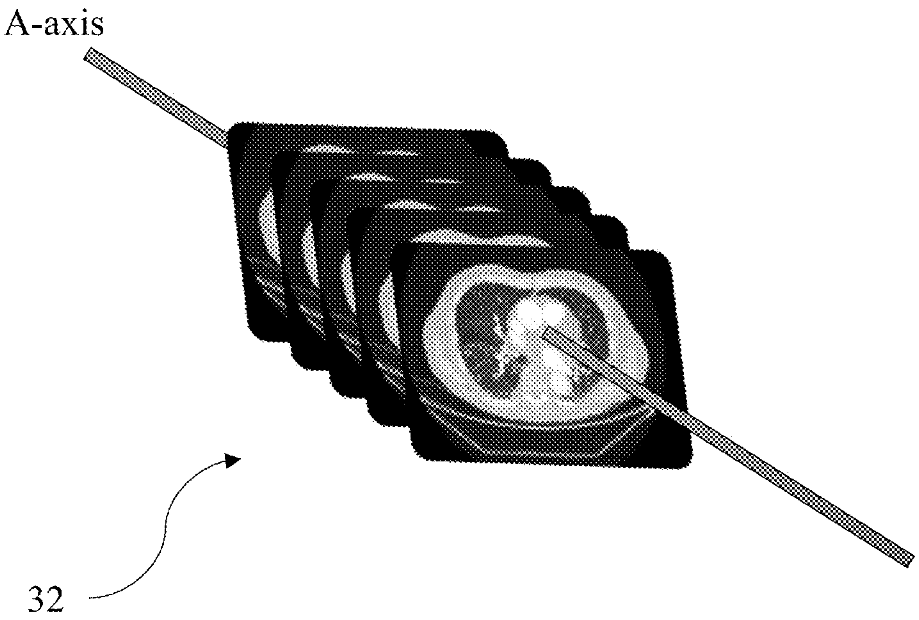
FIGS. 4A and 4B are schematic diagrams respectively illustrating the different postures of a user shown in scanned images and two-dimensional (2D) images photographed by the user according to a second embodiment of the present invention.
Figure 4B:
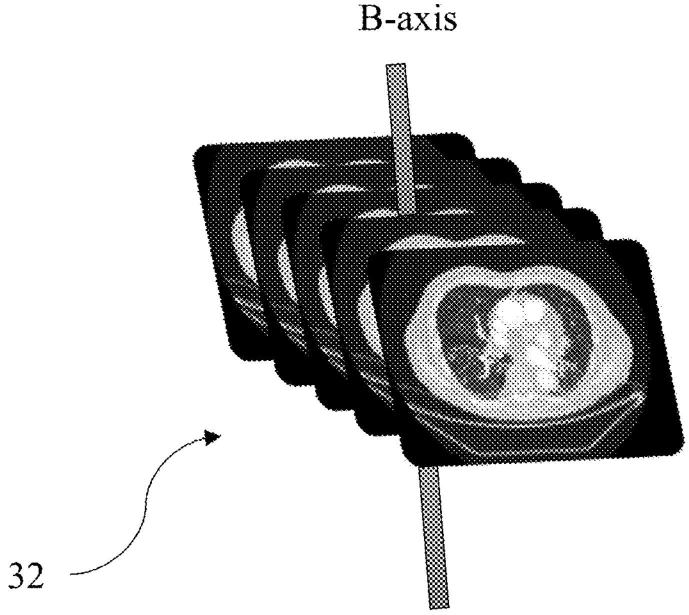

It should be noted that the user's posture when lying on the operating table is necessarily different from the posture when taking the scanned image 20. For example, the angle of the pelvis may be different when the user lies down. Please also refer to FIG. 4A and FIG. 4B, which are respectively schematic diagrams showing the different postures of the user 32 under the image-capturing device 12 and the X-ray machine 16, where the A axis in FIG. 4A represents the shooting angle of the image-capturing device 12 and the B-axis in FIG. 4B represents the shooting angle of the X-ray machine. It can be clearly seen from the figures that the postures and angles of the user 32 are different. Therefore, when the user 32 is lying on the operating table, there is a considerable error between his/her posture and the 3D model 22. It is necessary to reconstruct a 3D model that matches the current posture of the user 32 or correct the existing 3D model 22. When lying on the operating table, 3D information cannot be obtained. In order to construct a 3D surgical model of the body in the operation to know the position of the scalpel, the present invention sets up an X-ray machine 16 such as C Arm X-ray machine above the operating table in the operation room. The X-ray machine 16 photographs a set of 2D images 24 of the body of the user 32 during the operation and sends them to the host 14. The 2D images 24 include second marker points representing the positions of the positioning elements. When receiving the 2D images 24 sent by the X-ray machine 16, the second marker points on the 2D images 24 are aligned to the first marker points on the 3D model 22 to reconstruct the 3D model 22, thereby generating a 3D surgical model 26 representing the current posture of the user lying on the operating table. Thus, the posture of the body lying on the operating table can be accurately aligned to the correct positions of the body. The 3D surgical model 26 will be displayed on a display 18 for the doctor to determine whether the scalpel cuts to the lesion on the 3D surgical model 26 during the operation.

Figure 2:
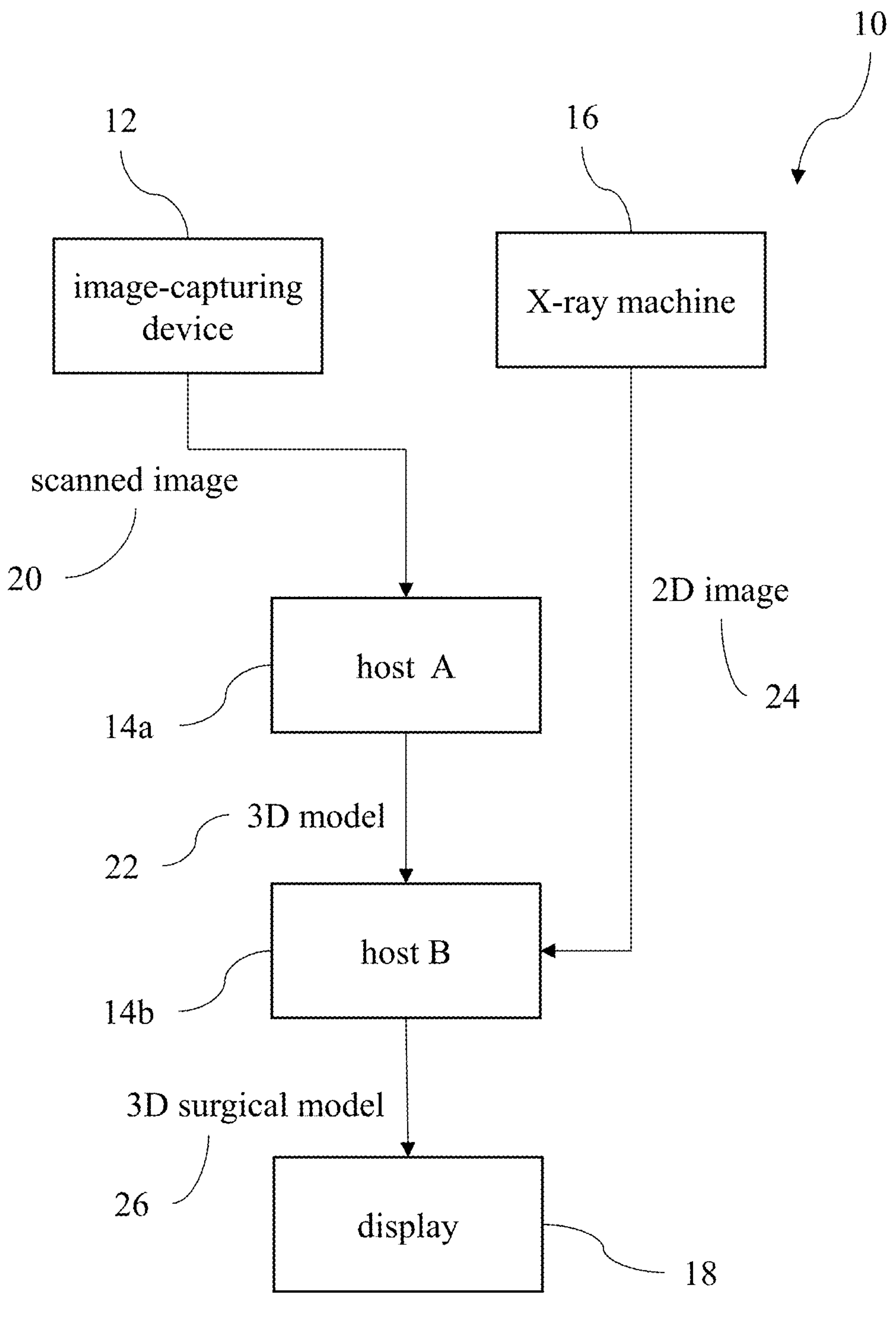
FIG. 2 is a schematic diagram illustrating a surgical positioning system according to another embodiment of the present invention.

The image-capturing device 12 and the X-ray machine 16 may be arranged in different places. The scanned data will be stored in different computers. Therefore, the present invention also has a block diagram according to another embodiment, as illustrated in FIG. 2. The surgical positioning system 10 includes positioning elements (not illustrated), an image-capturing device 12, an X-ray machine 16, a host A 14*a*, and a host B 14*b*. The host A 14*a* is connected to the image-capturing device 12. The host B 14*b* is connected to the X-ray machine 16. For example, the host A 14*a* and the image-capturing device 12 are both arranged in the examination room. The host B 14*b* and the X-ray machine 16 are arranged in the operation room. After the image-capturing device 12 scans the scanned images 20 of the user's body, the scanned images 20 are sent to the host A 14*a* and a 3D model 22 is generated based on the scanned images 20. The X-ray machine 16 photographs the 2D images 24 of the user's body during the operation and transmits them to the host B 14*b* in the operation room. Then host B 14*b* aligns the 2D images 24 to the 3D model 22 received from host A 14*a*, then converts the 3D model 22 into a 3D surgical model 26 of the user's posture during surgery, and displays the 3D surgical model 26 on the display 18.

Figure 3:
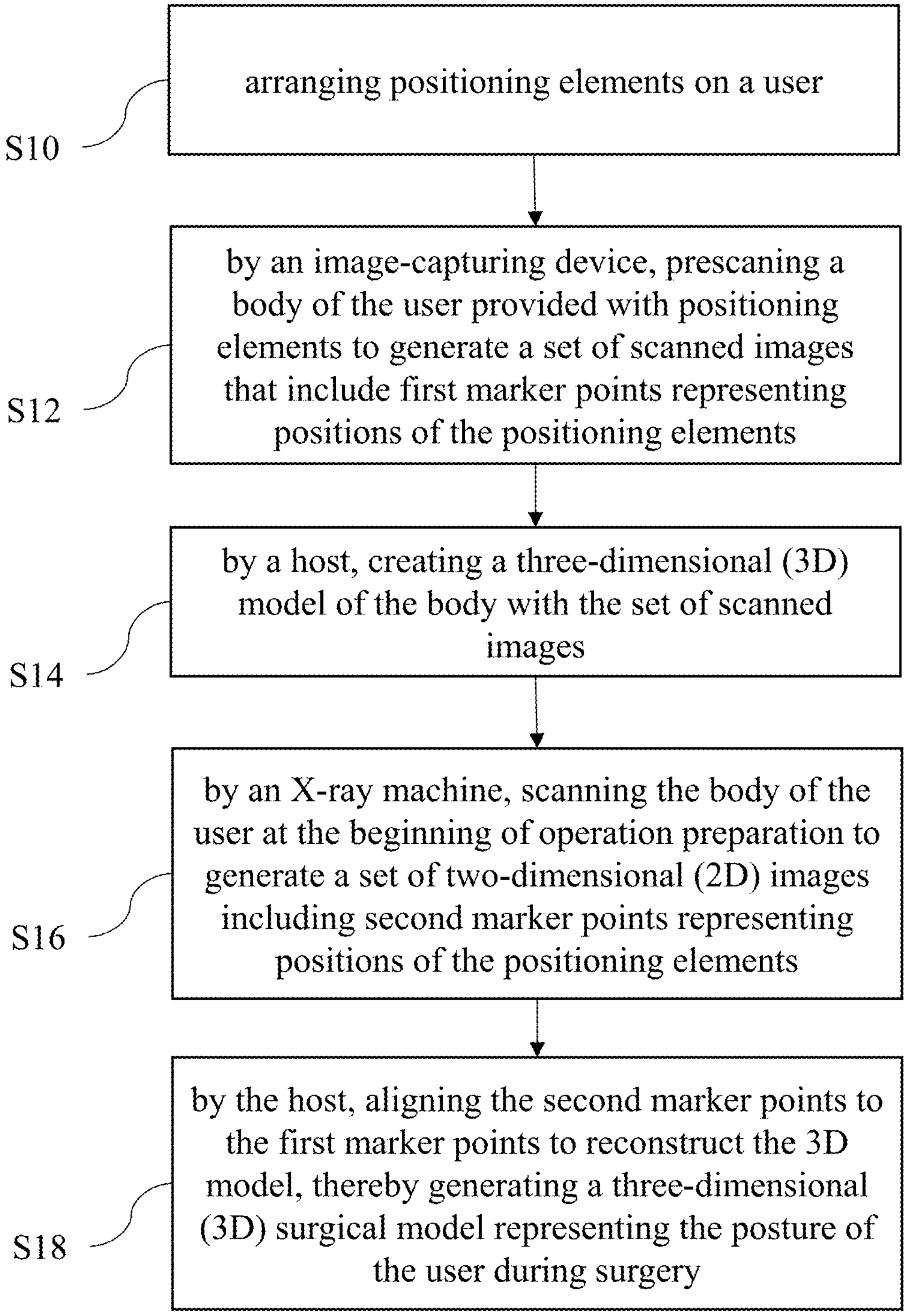
FIG. 3 is a flowchart of a surgical positioning method according to an embodiment of the present invention.

Please also refer to FIG. 3, which is a flowchart of the surgical positioning method of the present invention. In Step S10, the user is provided with positioning elements. In Step S12, the body of the user is prescanned by an image-capturing device 12 to generate a set of scanned images 20 that include first marker points representing the positions of the positioning elements. In Step S14, a host 14 creates a 3D model 22 of the body with the scanned image 20. Then, in Step S16, when the user is in the operation, an X-ray machine 16 scans the user's body to generate a set of 2D images 24 that include second marker points representing the positions of the positioning elements. Finally, in Step S18, the host 14*b* aligns the second marker points to the first marker points to reconstruct the 3D model 22, thereby generating a 3D surgical model 26 representing the posture of the user during surgery. Then, the host 14*b* displays the 3D surgical model 26 on a display 18. With the 3D surgical model 26, the doctor can determine whether the scalpel has cut to the correct position of the body.

Figure 5:
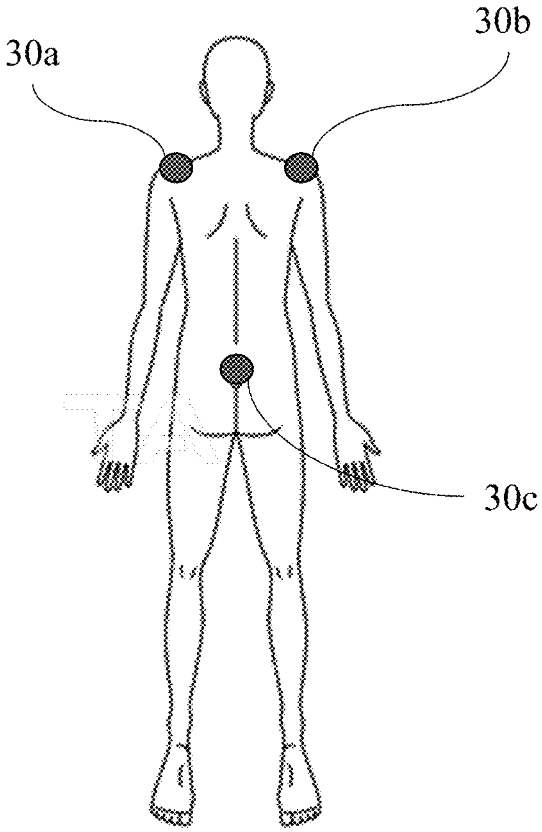
FIG. 5 is a schematic diagram illustrating the positions of positioning elements according to an embodiment of the present invention.

FIG. 5 is a schematic diagram illustrating the positions of positioning elements according to an embodiment of the present invention. When the number of the positioning elements must be greater than or equal to 3, the positioning elements can be positioned by triangulation positioning technology. The positioning element is a chip attached to the specific position of the user's body. This specific position refers to the corresponding position of immutable tissues, such as a bone or skin over a joint. As illustrated in FIG. 5, there are three positioning elements 30*a*, 30*b*, and 30*c*. The positioning elements 30*a* and 30*b* are arranged on the protruding bones of the left and right shoulders and the positioning element 30*c* is arranged on the coccyx. Since these positions have protruding structures, no matter what posture the user is in, these three protruding points can be easily found. Thus, it is easier to position the positioning elements 30*a*, 30*b*, and 30*c*.

The step of reconstructing the 3D model 22 to generate the 3D surgical model 26 comprises: setting the first marker points on the scanned images 20 to include a first reference point and first comparison points and setting the second marker points on the 2D images 24 to include a second reference point and second comparison points. For example, the positioning element 30*c* in FIG. 5 is used as the reference point and the positioning elements 30*a* and 30*b* are used as the comparison points. Then, the host aligns the first reference point to the second reference point. At this time, the rest of the comparison points have not yet been aligned. The 2D images 24 are comprehensively rotated and zoomed according to relative distances and relative angles between the first comparison points and the first reference point and relative distances and relative angles between the second comparison points and the second reference point, so that the first comparison points can respectively correspond to the second comparison points, thereby reconstructing the 3D model into a 3D surgical model.

In addition, the three positioning elements 30*a*, 30*b* and 30*c* in FIG. 5 are usually arranged in preset fixed positions and arranged on the torso. However, some affected areas are not on the torso. At this time, the 2D images 24 photographed by the X-ray machine 16 will be unable to capture the affected area that requires surgery. Therefore, the X-ray machine 16 photographs an auxiliary image of one of the affected areas of the user. The host 14 combines the 2D images 24 with the auxiliary image for precise positioning. For example, a knee joint operation requires the X-ray machine 16 to photograph one more local knee auxiliary image to help positioning. Firstly, the host 14 aligns the reference points and the comparison points on the 2D images 24 to the 3D model 22. The 3D model includes the whole body of the user, not only the torso. Then, the host 14 inserts the auxiliary images of the affected area into the 3D model 22 and extracts the 3D surgical model 26 including only the affected area to complete precise positioning.

In conclusion, generally if the body has more serious lesions, a body scan will be performed first in the outpatient clinic to generate a 3D lesion model. However, the posture of the user during the operation must be different from that during the inspection. Thus, it cannot rely solely on the previous 3D model for precise positioning during surgery. The surgical positioning system and the positioning method of the present invention provide the 2D images photographed by the X-ray machine during the operation, so as to convert the 3D model into the current posture of the user lying on the operating table. This way, only one X-ray image is photographed and the positioning elements can be used to determine where the current position of the scalpel is located in the superimposed image and whether the angle needs to be adjusted. That is to say, there is no need to photograph multi-angle X-ray images during the operation.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A surgical positioning system comprising:

positioning elements arranged on a user;

an image-capturing device configured to prescan a body of the user to generate a set of scanned images that include first marker points representing positions of the positioning elements;

an X-ray machine configured to photograph the body of the user at beginning of operation preparation to generate a set of two-dimensional (2D) images including second marker points representing positions of the positioning elements; and a host connected to the image-capturing device and the X-ray machine and configured to create a three-dimensional (3D) model of the body with the set of scanned images, and align the second marker points to the first marker points to reconstruct the 3D model, thereby generating a three-dimensional (3D) surgical model representing a posture of the user during surgery, wherein the first marker points include a first reference point and first comparison points, the second marker points include a second reference point and second comparison points, and after the host aligns the first reference point to the second reference point, the host rotates the set of 2D images according to relative distances and relative angles between the first comparison points and the first reference point and relative distances and relative angles between the second comparison points and the second reference point, and moves the first comparison points to respectively correspond to the second comparison points, thereby reconstructing the 3D model into the 3D surgical model.

2. The surgical positioning system according to claim 1, wherein the positioning elements are attached to corresponding positions of the user.

3. The surgical positioning system according to claim 1, wherein the positioning elements are arranged in corresponding positions of immutable tissues including bones or joints.

4. The surgical positioning system according to claim 1, wherein the X-ray machine is arranged above an operating table, and when the user is lying on the operating table and ready to start operation, the X-ray machine photographs the set of 2D images.

5. The surgical positioning system according to claim 1, wherein the X-ray machine further photographs an auxiliary image of an affected area of the user, and the host is configured to combine the set of 2D images with the auxiliary image for precise positioning.

6. The surgical positioning system according to claim 1, wherein the image-capturing device is a computerized tomography (CT) device, a magnetic resonance imaging (MRI) device, a positron emission tomography device, or a single-photon emission tomography device.

7. A surgical positioning method comprising:
- by an image-capturing device, prescanning a body of the user provided with positioning elements to generate a set of scanned images that include first marker points representing positions of the positioning elements;
- by a host, creating a three-dimensional (3D) model of the body with the set of scanned images;
- by an X-ray machine, scanning the body of the user at beginning of operation preparation to generate a set of two-dimensional (2D) images including second marker points representing positions of the positioning elements; and
- by the host, aligning the second marker points to the first marker points to reconstruct the 3D model, thereby generating a three-dimensional (3D) surgical model representing a posture of the user during surgery, wherein a method of generating the 3D surgical model comprises:
- setting the first marker points to include a first reference point and first comparison points and setting the second marker points to include a second reference point and second comparison points;
- by the host, aligning the first reference point to the second reference point; and
- by the host, rotating the set of 2D images according to relative distances and relative angles between the first comparison points and the first reference point and relative distances and relative angles between the second comparison points and the second reference point and moving the first comparison points to respectively correspond to the second comparison points, thereby reconstructing the 3D model into the 3D surgical model.

8. The surgical positioning method according to claim 7, wherein the positioning elements are attached to corresponding positions of the user.

9. The surgical positioning method according to claim 7, wherein the positioning elements are arranged in corresponding positions of immutable tissues including bones or joints.

10. The surgical positioning method according to claim 7, wherein the X-ray machine is arranged above an operating table, and when the user is lying on the operating table and ready to start operation, the X-ray machine photographs the set of 2D images.

11. The surgical positioning method according to claim 7, wherein the X-ray machine further photographs an auxiliary image of an affected area of the user, and the host combines the set of 2D images with the auxiliary image for precise positioning.

* * * * *